US007788372B2

(12) United States Patent
Chapman et al.

(10) Patent No.: US 7,788,372 B2
(45) Date of Patent: Aug. 31, 2010

(54) ADVISORY SYSTEMS AND METHODS

(75) Inventors: Karl Chapman, Easton-on-the-Hill (GB); Christine Clarke, West Kirby (GB); Lesley Sweeney, Willaston (GB)

(73) Assignee: AdviserPlus Business Solutions Ltd., Bromborough, Wirral (GB)

( * ) Notice: Subject to any disclaimer, the term of this patent is extended or adjusted under 35 U.S.C. 154(b) by 225 days.

(21) Appl. No.: 11/839,741

(22) Filed: Aug. 16, 2007

(65) Prior Publication Data

US 2008/0062895 A1 Mar. 13, 2008

(30) Foreign Application Priority Data

Sep. 13, 2006 (GB) ................................. 0618030.1

(51) Int. Cl.
*G06F 15/177* (2006.01)
*G06F 7/16* (2006.01)
*G06F 15/16* (2006.01)
*G06F 15/173* (2006.01)

(52) U.S. Cl. .......................... 709/224; 726/22; 726/28; 726/33; 709/203; 705/1

(58) Field of Classification Search ......... 709/217–228, 709/203; 705/1; 707/200; 726/22, 28, 33
See application file for complete search history.

(56) References Cited

U.S. PATENT DOCUMENTS

2004/0054717 A1* 3/2004 Aubry et al. ................ 709/203
2005/0097016 A1* 5/2005 Barnard et al. ................ 705/30
2006/0009991 A1* 1/2006 Jeng et al. ...................... 705/1
2006/0059107 A1* 3/2006 Elmore et al. ................ 705/64
2006/0212486 A1* 9/2006 Kennis et al. ............... 707/200
2006/0265739 A1* 11/2006 Bhaskaran et al. ............ 726/4
2007/0214208 A1* 9/2007 Balachandran .............. 709/201

* cited by examiner

*Primary Examiner*—Haresh N Patel
(74) *Attorney, Agent, or Firm*—Beyer Law Group LLP

(57) ABSTRACT

A method, computer program product and computer platform for delivering allowing an advisory services provider to provide advisory services to an organisation is described. Information relating to a plurality of different topics is accessible over a computer network by a plurality of end users of the organisation. Access to the information by the end users is monitored. It is determined when information relating to a topic identified as being high risk or complicated has been accessed by an end user. The method then ensures that a communication between the end user and an individual authorised to advise on the topic is initiated to allow advice to be provided to the end user. The advisory services platform can include a content delivery module operable to provide a website to the end users and also operable to monitor and track access to the information by end users. A call and case management module can interact with the content delivery module to record details of communications between the end users and call co-ordinators and/or advisors.

12 Claims, 15 Drawing Sheets

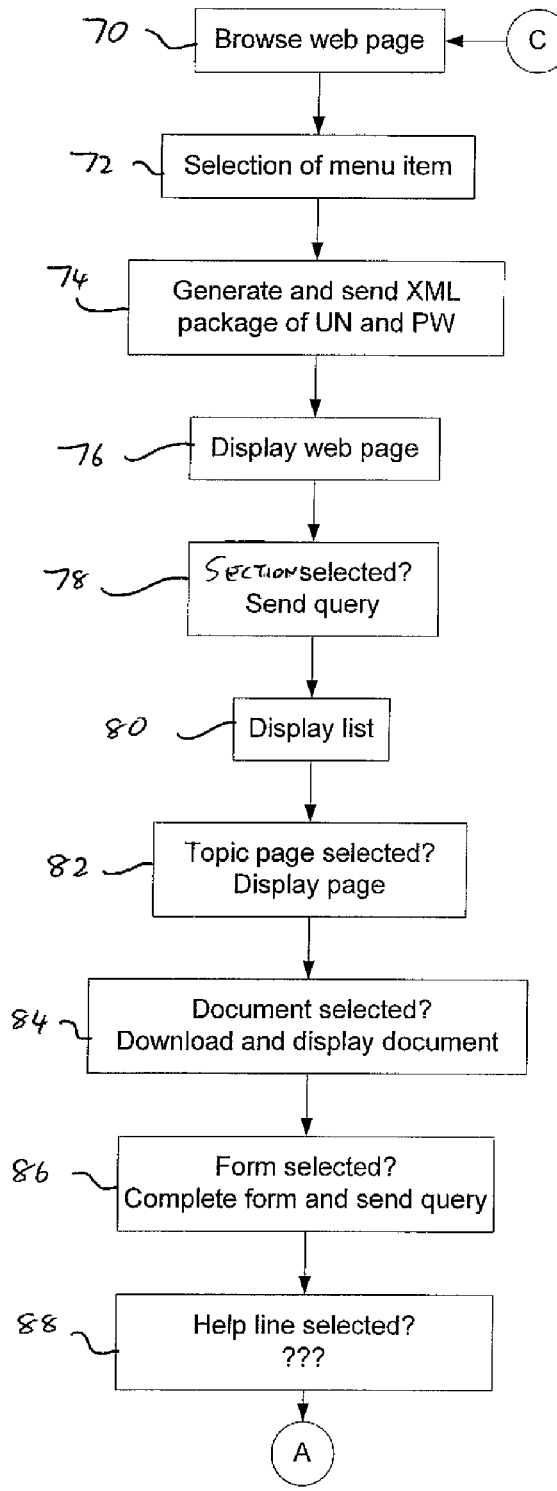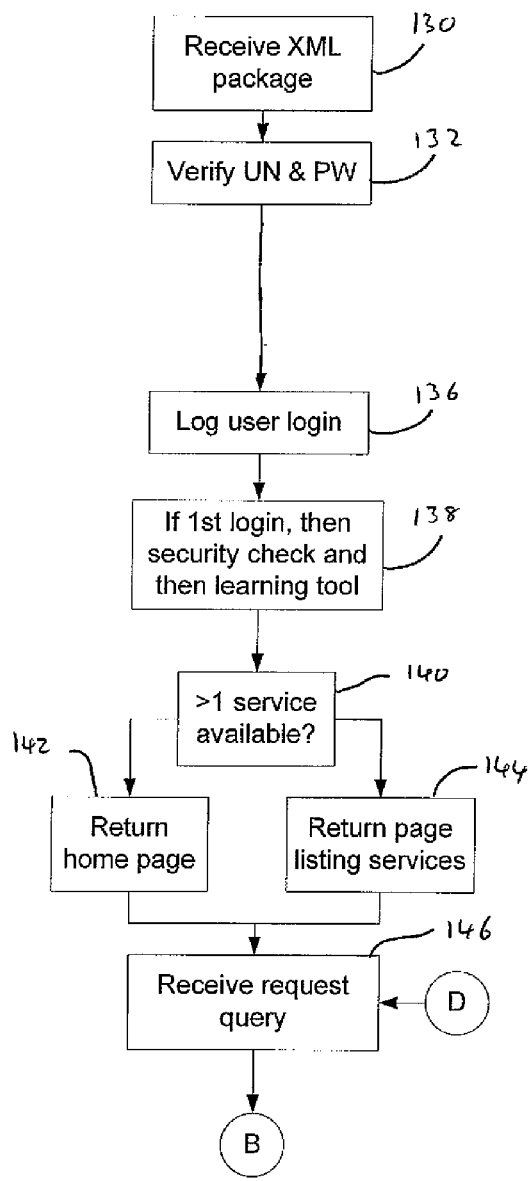

ADVISORY SYSTEMS AND METHODS

FIELD OF THE INVENTION

The present invention relates to advisory services, and in particular to data processing apparatus, computer programs and methods allowing a computer implemented advisory system to be integrated into an organisation and for providing advisory services to the organisation.

BACKGROUND OF THE INVENTION

Various computer based approaches exist which allow an organisation to obtain information. At its simplest, this can be in the form of a website making information on a topic freely available, or available on a subscription basis, to users who can view the information, and possibly download documents, via a browser. However, the information available in this way tends to be general and cannot easily be tailored to its users as the nature of the users is not known beforehand.

At a more sophisticated level, a body providing advisory services, such as attorneys, accountants or other professional services or consultancy firms, may provide a part of their website that clients can log on to in order to obtain general information on various issues. However, again, it is difficult to ensure that the available information is correctly targeted to the potential user. It may be difficult for the user to find the relevant information, if available, or the appropriate level of detail may not be available to answer the user's enquiry.

If a member of an organisation does consult an internal, or external, source of information, then there is not necessarily a mechanism for identifying that enquiry, determining its nature or checking that any action has been completed. There is also no mechanism for ensuring that the information source is reliable. Therefore, there are significant potential risks and liabilities that an organisation may face as a result of members of the organisation consulting information sources outside of the organisation's control.

Some organisations have significant internal advisory resources, such as legal and human resources (HR) departments. However, not all organisations are sufficiently large to have such specialist advisors available to handle enquiries. Even large organisations that do have internal advisory resources, may not have the specialist expertise available to advise on all potential enquiries.

Therefore, there is a need to make advisory services available to all sizes of organisations in a controllable and bespoke manner. Hence, the present invention provides intelligent advisory services which can be seamlessly integrated into organisations of different sizes.

SUMMARY OF THE INVENTION

According to a first aspect of the invention, there is provided a method for an advisory services provider to provide advisory services to an organisation. The advisory services provider can provide information relating to a plurality of different topics accessible over a network by a plurality of end users being members of the organisation. Access to the information by the end users can be monitored. It can be determined when information relating to a topic identified as being high risk or complicated has been accessed by an end user. The method can ensure that a communication between the end user and an individual authorised to advise on the topic is initiated to allow advice to be provided to the end user.

Hence, the method helps to ensure that when an end user accesses information which is high risk or complicated, then it can be ensured that an authorised individual communicates with the end user to advise on the topic, so that the end user does not take incorrect action.

Communication can be ensured by monitoring to determine whether the end user initiates the communication or initiating the communication with the end.

The method can further comprise determining that the topic corresponds to a topic identified as requiring escalation to a particular type of authorised individual. The communication can then be initiated between the end user and the particular type of authorised individual. For example, the authorised individual can be a professional or hold a particular qualification in a certain field, such as, for example, human resources, the law, health and safety, financial matters, etc.

The authorised individual can be internal to the organisation or can be external to the organisation. For example the authorised individual can be an employee or officer of the organisation. The authorised individual can be a professional advisor to the organisation, such as, for example, an attorney, consultant or other professional.

The authorised individual can be a member, employee or officer of the advisory services provider.

Ensuring that a communication is initiated can further comprise determining whether the end user has communicated with the advisory service provider within a predetermined time period. If not, then the method can further comprise initiating the communication between the end user and the authorised individual.

The method can further comprise providing a communication channel between an end user and at least one co-ordinator who can manage communications between end users and the advisory services provider.

The at least one co-ordinator can also manage case records relating to end user access of information and/or communications between the end user and authorised individuals.

The method can further comprise displaying a visual indication that the end user is required to contact the advisory service provider when information relating to a topic identified as being high risk or complicated is being accessed by an end user. The visual indication can include an icon of a telephone. The visual information can also include a telephone number to be used.

The method can further comprise documenting and/or recording all interactions between the end user and an adviser and/or co-ordinator of the advisory services provider. All interactions between all end users and an adviser and/or co-ordinator can be documented and/or recorded.

The method can further comprise providing data relating to interactions between at least one, a plurality or all end users and the advisory services provider in at least one or a plurality of different reporting formats.

A further aspect of the invention provides a method for an advisory services provider to provide advisory services to an organisation. The advisory services provider can provide a website of information relating to a plurality of topics to end users being members of the organisation. The advisory services provider can provide advisers who are authorised by the organisation to provide advice to the end users on a first group of topics according to business rules agreed between the advisory service provider and the organisation.

Hence, the organisation can be provided with outsourced advisory services and still maintain control over those topics on which advice has been outsourced.

The further can further comprise the advisory service provider not providing advice to the end users on a second group of topics and transferring responsibility for advising on the second group of topics to an authorised party or parties not being part of the advisory service provider. The authorised party or parties can be internal or external to the organisation.

A technology platform is provided that facilitates the delivery of online, telephone and e-mail-based professional advisory services to a client organisation. A single platform has been developed that can support all services, from a branded service which can be delivered directly to mid-sized and large businesses, to a white-labelled service which can be delivered through trusted partners to SMEs.

A further aspect of the invention provides a computer implemented advisory services platform allowing an advisory services provider to provide advisory services to an organisation. The platform can include a content delivery module operable to provide a website to end users of the organisation. The website can include information on a plurality of topics. The content delivery module can also be operable to monitor and track access to the information by end users. The platform can include a call and case management module which interacts with the content delivery module and which is operable to record details of communications between the end users and call co-ordinators and/or advisors of the advisory services provider.

Hence, the platform provides a mechanism by which advisory services can be outsourced from the organisation.

The platform can include a platform set up module operable to configure a default platform and build a platform tailored to a specific organisation and/or the advisory services to be provided to the specific organisation.

The platform can further comprise a reporting module which can interact with the content delivery module and/or call and case management module and operable to generate a plurality of different reports based on data stored by the platform. The reporting module can further be configured to provide different types of reports or reports including different information or in different formats to different members of the organisation.

The platform can be hosted by at least one server in communication with a database having a plurality of tables storing data used by the platform.

The server can be in communication with at least a first computer of the organisation via a computer or communications network, such as a wide area network.

The modules of the platform can be accessible via a browser application.

A further aspect of the invention provides a method for an advisory services provider to provide advisory services to an organisation. The advisory services provider can carry out a scoping study with the organisation and agree a set of business rules specifying what advisory services are to be provided and/or how. An advisory information website can be built by modifying default information in order to tailor the website to the organisation. The website can be provided to be accessible by end users of the organisation. Advice can be provided to end users of the organisation that have viewed the website, in line with the set of business rules.

A further aspect of the invention provides a computer readable medium bearing computer program instructions which when loaded into a computer system configure the computer system to: provide information relating to a plurality of different topics accessible over a computer network by a plurality of end users being members of the organisation; monitor access to the information by the end users; determine when information relating to a topic identified as being high risk or complicated has been accessed by an end user; and ensure that a communication between the end user and an individual authorised to advise on the topic is initiated to allow advice to be provided to the end user.

BRIEF DESCRIPTION OF THE DRAWINGS

An embodiment of the invention will now be described in detail, by way of example only, and with reference to the accompanying drawings, in which:

FIGS. 7A & 7B show a process flow chart illustrating operation of the system to provide a user with advisory information;

FIGS. 7C & 7D show a process flow chart illustrating operations carried out by the system in parallel with the process illustrated by FIGS. 7A & 7B;

FIGS. 10, 11 & 12 show screen shots of parts of the user interface of the case and call manager module generated during the process illustrated in FIGS. 9A & 9B.

DETAILED DESCRIPTION OF THE PREFERRED EMBODIMENTS

Figure 1:
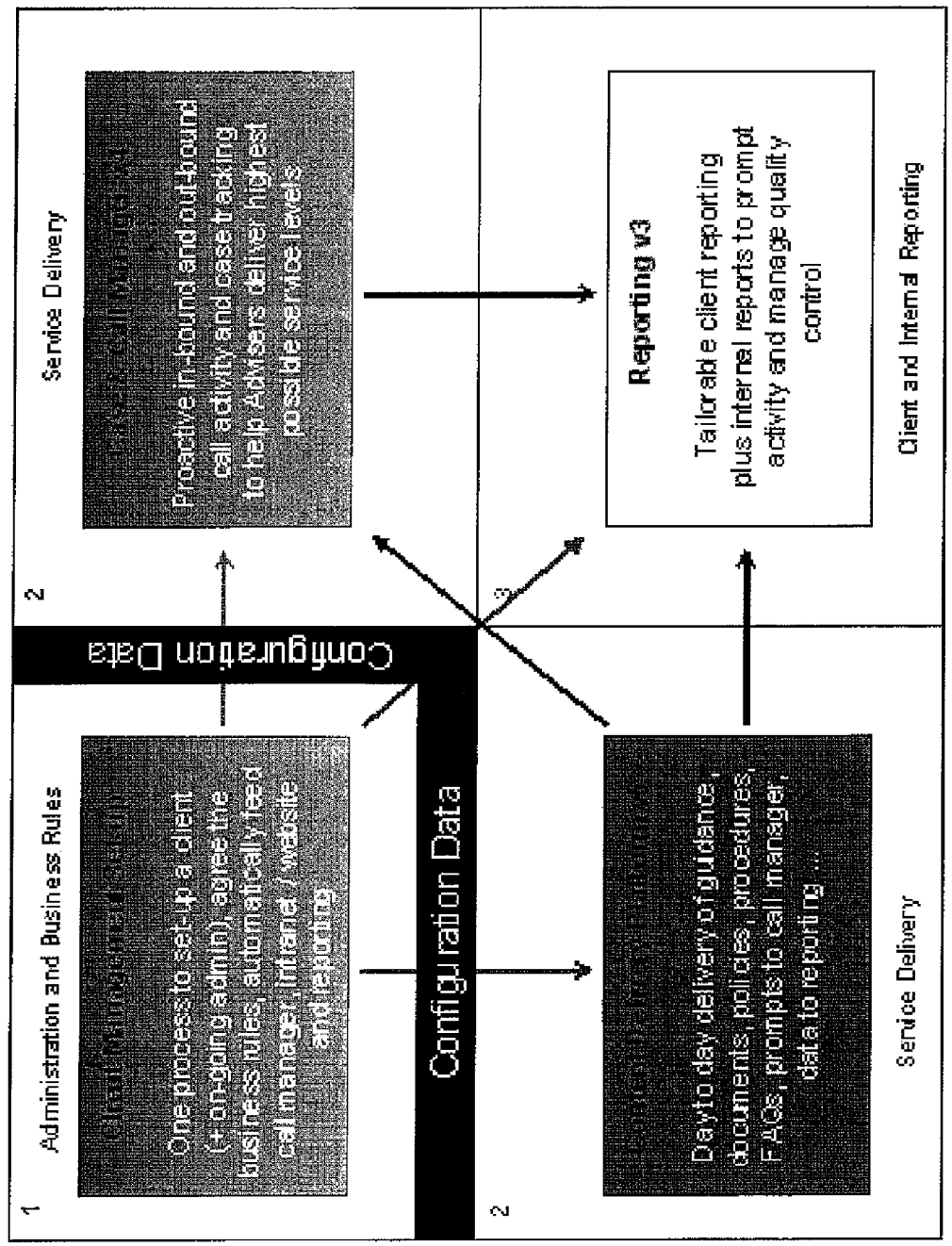
FIG. 1 shows a schematic block diagram of the software architecture of the invention.

A high level overview of the invention will initially be provided. With reference to FIG. 1, the platform 10 comprises four core components, or modules, implemented in software and hardware:

Client and Information Manager (CIM)

Content Delivery Platform (CDP)

Case and Call Manager (CCM)

Management Reporting Suite (MRS)

The invention provides the integration of these four elements. The invention also includes specific workflow processes realised by these elements. These elements also facilitate proactive outbound email and call activity.

The client and information manager (CIM), sometimes referred to herein as the client management system (CMS), includes a real-time database that hosts all the client and service information required to underpin online, email and advice line service delivery.

The client and information manager is split into three key areas:

Service Defaults: which handles the set up of default online content, including advice and guidance, legislation and document templates.

Client Administration: which handles the input of non content specific data to enable the client/service set up, including response times, SIC codes and site types.

Client Configuration: which handles the customisation of the default content for each client's service, including tailoring any guidance, document or structure, as well as setting up user information and security.

The CIM provides the ability to input client details and business rules once. These details then automatically feed the three other elements of the system and dictate how users are handled and responded to. The platform also enables the tailoring of content and inbound/outbound call activity to an individual user for an unlimited number of users.

The content delivery platform (CDP) is the agent that sits between CIM and the window through which the client views their service. It pulls through the default and customised content from CIM, interprets that into a client-facing format and presents a professional looking website in the appropriate brand. It also facilitates outbound call activity when a user crosses a designated area and fails to call the advice center The case and call manager (CCM) provides a client relationship platform which enables the recording of all inbound and outbound call and e-mail activity by professional advisors and call co-ordinators. Its defaults for each client and service are fed by both CIM and CDP. Its presentation is deliberately confined to a minimum number of screens, but this belies the depth of support it provides. It is much more than simply a data-recording tool: built from the bottom up, it contains a variety of proactive and interactive measures to ensure the ultimate service delivery and case management. Call manager also integrates with voice-over IP telephony, and all calls are recorded. The Case and Call Manager provides: case tracking, which means that callers are always dealt with by the same adviser to ensure consistency and relationship building; pop-up tools that ensure co-ordinators cannot mistakenly pass calls to advisors that should be escalated to the client; and activity flags that ensure any actions that require follow-up by the user or advisors are always followed-up.

Management information is provided by a reporting component, also referred to herein as the Management Reporting Suite (MRS). The entire platform is supported by a comprehensive reporting functionality. This covers the service defaults, client settings and customised service elements set up in CIM, each click by every user of the online services via CDP and all call and e-mail activity recorded in Case and Call Manager. The data is manipulated into meaningful and well-presented reports, certain of which may be accessed directly by named client contacts, as agreed in the business rules. Reporting is both internal to the provider of the platform and also external to the client organisation. Clients can access the reports in real-time, securely, online.

In one embodiment, the platform is built in Microsoft Windows 2003, programmed in MS.NET 2, using both VB script and C#, and is supported by a Microsoft SQL Server 2005 database and uses Microsoft SQL Server Report Services to extract data for management information purposes (MICROSOFT and WINDOWS are trade marks of Microsoft Corporation).

Figure 2:
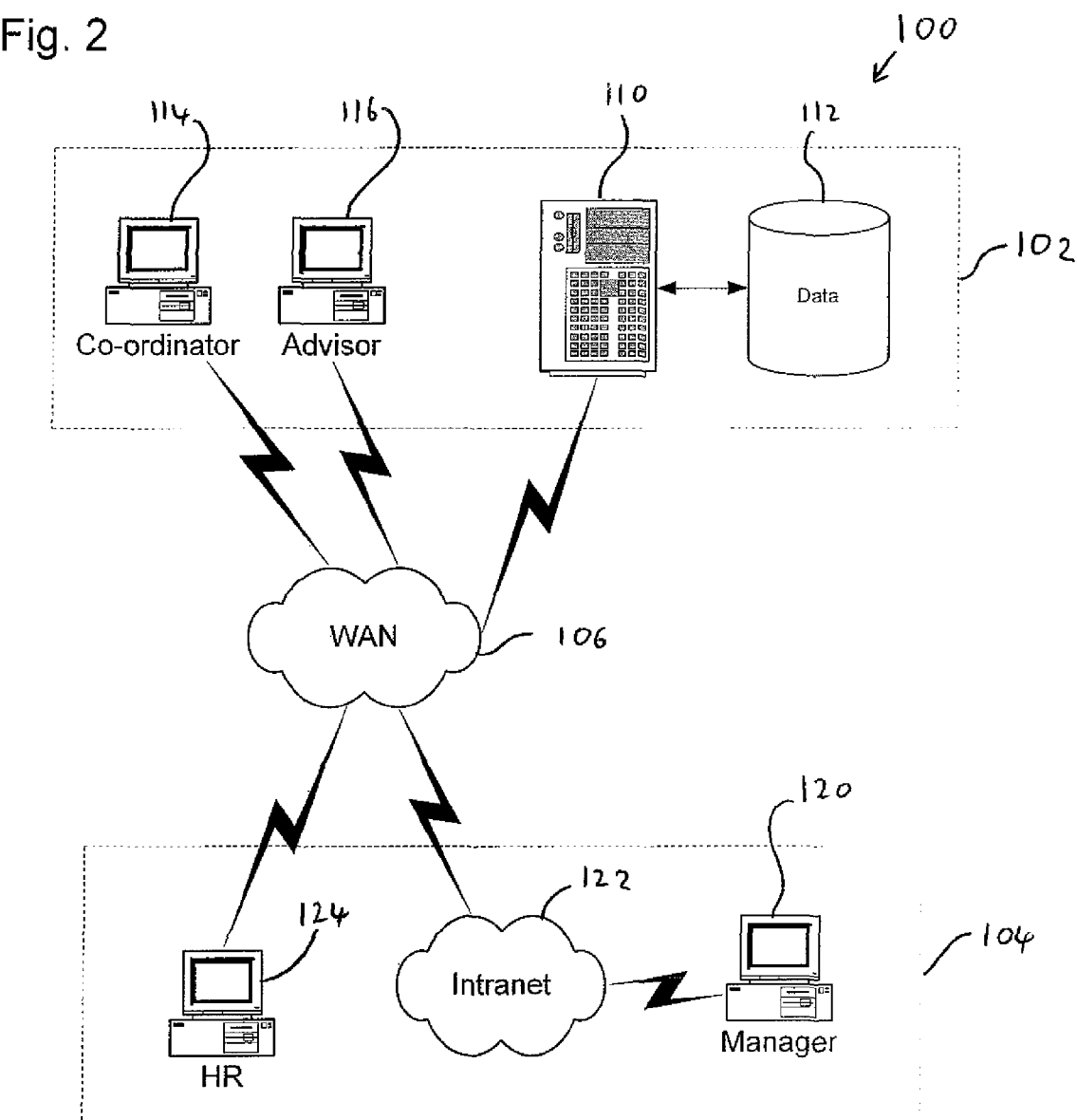
FIG. 2 shows a schematic block diagram of an example hardware architecture of a system including the invention.

With reference to FIG. 2 there is shown a schematic block diagram of a hardware architecture 100 of a system according to the invention within which the platform 10 of the invention can be provided. A first site 102 includes the hardware elements hosted by a provider of advisory services. A second site 104 hosts the hardware components of an organisation to which integrated advisory services are being provided. The hardware elements of the organisation and of the advisory service provider can communicate via a wired area network 106, such as the Internet.

This example embodiment of the invention will describe the provision of human resource (HR) advisory services to a business, but it will be appreciated that the invention is not limited to this particular advisory service. It will be appreciated that different advisory services can be provided. Further, advisory services may be provided by a service provider external to the organisation or internally to the organisation or a combination thereof.

The advisory service provider site 102 includes a server or servers 110 hosting the platform 10. Server 110 is in communication with a database 112, which can include a database server hosting a database management system. Suitable database software is SQL server 2005. The database 112 includes a number of tables having fields for storing a number of data items as will be described in greater detail below. The server 110 hosts a number of applications providing the components of the platform 10 as illustrated in FIG. 1 which will be described in greater detail below with reference to FIG. 3.

The advisory service provider site 102 also includes at least one computer 114 which includes browser software via which a call co-ordinator can interact with the platform on a client-server basis. In practice, a plurality of co-ordinator client computers 114 can be provided. At least one computer 116 is provided having browser software by which an advisor can interact with the platform hosted on server 110 on a client-server basis. Again, in practice, a plurality of advisor client computers 116 will be provided. Client computers 114, 116 can access server 110 via wide area network 106. Therefore, co-ordinator and advisor client machines 114, 116 do not need to be physically local to the server 110. However, in other embodiments, the client computers 114, 116 can communicate with server 110 over a local network.

Organisation site 104, which may be a company, business, university or any other type of organisation, includes at least a first computer 120 including browser software via which a user of the computer, e.g. a manager, can view information hosted on server 110 on a client-server basis. As illustrated in FIG. 2, manager client computer 120 is connected to an internal network 122 of the business, such as an intranet. It will be appreciated that in practice there will be a plurality of client computers 120. In other embodiments, manager client computer 120 may communicate directly via wide area network 106 with server 110. The organisation site 104 may also include a further computer 124 having browsing software using which an internal advisor of the business, such as an HR professional, can communicate with server 110 to interact with the platform 10 on a client-server basis. As illustrated in FIG. 2, advisor client 124 communicates with server 110 via wide area network 106 and so need not be local to the organisation site 104.

In other embodiments, advisor client computer 124 may also communicate with intranet 122 if local. In other embodiments, advisor client 124 may not be an internal advisor of the business but may be an external advisor, for example working for a consultancy firm.

Figure 3:
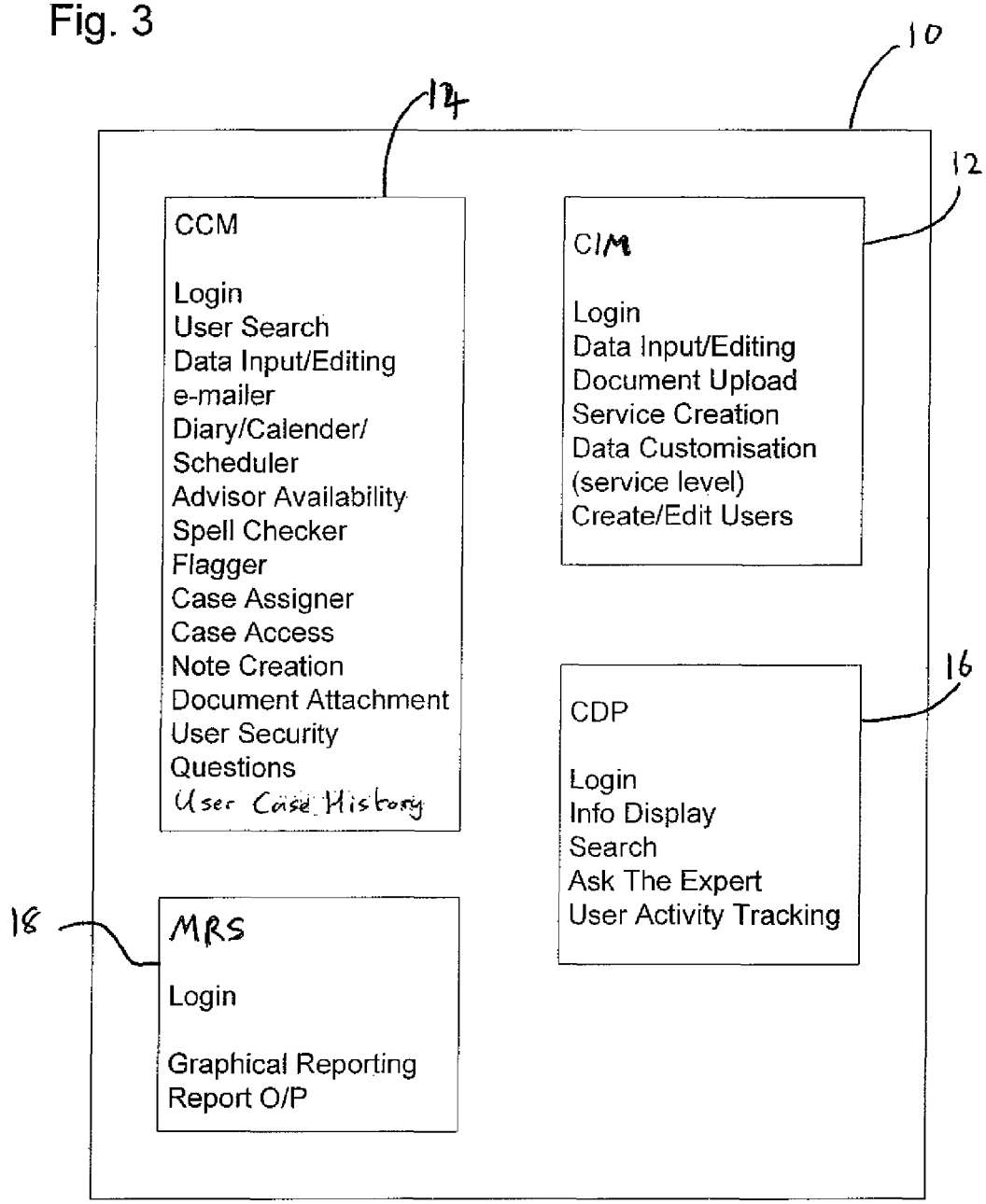
FIG. 3 shows a schematic block diagram illustrating the functionalities implemented by the modules of the software architecture shown in FIG. 1.

With reference to FIG. 3, there is shown a schematic block diagram illustrating the functionalities provided by the modules of platform 10 in greater detail.

The Client and Information Management (CIM) module 12 includes a number of functionalities. The CIM module is used by an administrator or developer to develop, implement and maintain the platform 10. The CIM module 12 is used to set up the platform, customise it to a particular organisation's requirements and to provide various data to the other modules as part of an overall integrated architecture. In particular, the CIM module includes functionalities allowing a user to carry out the following tasks, not all of which are illustrated in FIG. 3: logging in; default data input and editing; the uploading of documents; creating a customised service for a client based on agreed business rules; customisation of a default service for a particular client; the creation and editing of profiles for end users of the platform; configuring 'red telephone' calls to action via CDP; security settings; entering settings to configure the output of the CDP; and entering settings to update the service configuration in the CCM. The CIM module is also used to build a website based on a skeleton structure but customised to the end user. The CIM module interacts with database 112 to populate data items in various tables and to retrieve standard documentation and data from the database to populate those tables.

The Content Delivery Platform (CDP) module 16 handles the real time delivery of information to the end user by the generation and display of web pages, downloading documents, generating forms and other typical web page based activities. The CDP module also monitors the information being displayed to determine when information identified as high risk, or of a complicated nature, has been provided to an end user. The CDP module includes functionalities allowing: user log-in; display of information and documents; searching of the website; an ask the expert e-mail enquiry function; and tracks user activity on the web site. Again, the CDP module interacts with database 112 by updating the tables therein to generate data upon which all activities of the user of the website can be determined and tracked.

The Case and Call Manager (CCM) module 14 is used by co-ordinators and advisors of the advisory service provider in order to monitor, react to and pro-actively act upon certain activities of the end users of the website. The CCM allows the co-ordinating advisors to interactively manage inbound and outbound call activity with the end users and to monitor the progress of any high risk activities of the end users. The CCM module also allows the advisors to provide a consistent and high level of service to the end users. The CCM module 14 includes a number of functionalities, not all illustrated in FIG. 3, including: a log in function; the ability to search for end users of the system; data input and editing; an e-mailer allowing the generation and sending of emails; a diary/calendar/scheduler application allowing actions to be diarised for future activity; advisor availability module for determining which advisors are available and when; a spell checker; a flagger for flagging the importance or status of various actions; a case assignor for assigning new cases to different co-ordinators; a case access module for accessing cases generated; a note creation function for annotating cases; a document attachment function allowing documentation to be attached to different cases; a user security function to allow users of the system to be validated; a questions function which generates a predefined series of questions to ask end users; a user case history module, which recalls advice previously provided to an end user; an outbound call activity management system, triggered by activity in the CDP; a case owner transfer function, allowing the owner of a case to be changed, and incorporating relevant security checks; a case owner's profile viewing function, which allows a case owner's profile to be viewed on the fly; and an 'ask the expert' e-mail enquiry system.

The Management Reporting Suite (MRS) module 18 is also provided which can be made available to certain end users of the business in order to produce tailored reports and also to allow the advisory service to generate internal reports for quality control and other purposes. The reporting module 18 includes a number of functionalities, including; a log-in; a search function; a graphical reporting function allowing different graphical displays of data from the database 112; and a report outputting function allowing hard copies or soft copies of reports to be generated and distributed. The reporting functionalities available can be limited by the log-in function so that certain types of data are only available depending on the user privileges as determined during log-in. Also, the portfolio of reports that may be run by an individual user can be configured specifically to that user.

Figure 4A:
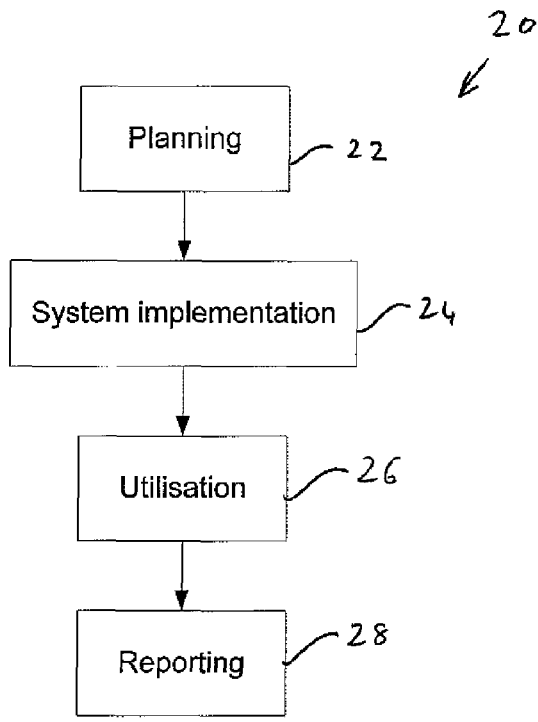
FIG. 4A shows a flow chart illustrating a general method of providing the system of the invention.

FIG. 4A shows a flowchart illustrating a general method by which the advisory service platform 10 is created and integrated into an organisation, e.g., a business. Method 20 begins with a planning phase 22 during which the advisory service provider conducts a number of meetings with the business to determine which different advisory services the business requires: HR advisory services, credit control advisory services, health and safety advisory services, etc, for example. This also involves determining what materials the business already has, for example in terms of HR documentation and/or policies, determining who the end users will be and what different user privilege profiles they may have, determining the business rules specifying who will handle enquiries relating to topics having different risk levels and generally scoping and planning implementation of the system.

In a system implementation phase 24, the advisory website is set up using the CIM module 12, as will be described in greater detail below. Once the system has been set up and rolled out, then in phase 26 the advisory website can be used by authorised users of the business.

Figure 4B:
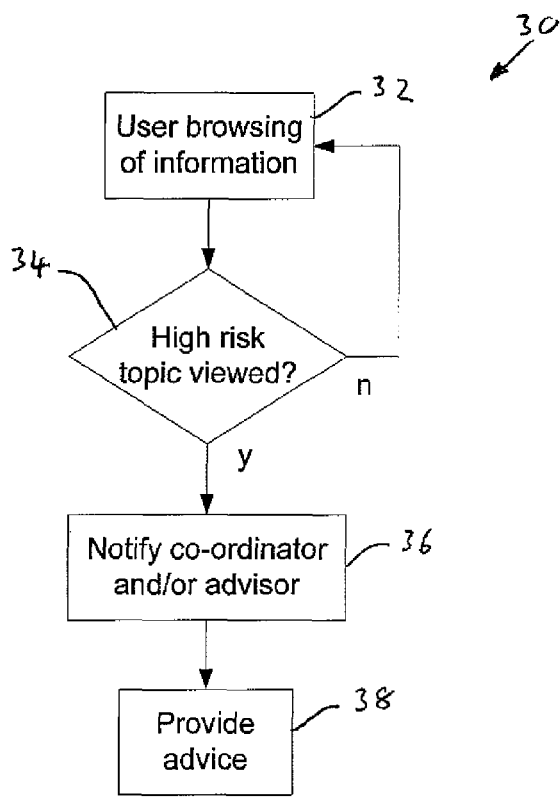
FIG. 4B shows a high level flow chart illustrating the method of operation of the system according to the invention.

An overview of the method of use 30 of the platform is illustrated by the flow chart of FIG. 4B. A manager of the business uses client computer 120 to browse the advisory website and can view various types of information at step 32. Some of the information available on the website is low or no risk and some of the information available on the website may have varying degrees of risk associated with it. For example, HR information relating to job titles may be considered to be of no or little risk, whereas HR information relating to working hour legislation or rules may be considered to be of some risk as it may show that there is a potential working hours issue which the manager needs advice on. As a further example, information relating to redundancy may be considered to be high risk as that may indicate that there is redundancy issue which the manager is considering.

As the manager browses different types of information on the website, the risk status of the information is monitored by the CDP (as configured in an individual end user's profile in the CIM, and as agreed in the business rules for the service) and if the risk status is determined 34 not to hit a threshold level then no secondary action is required and the user continues browsing information 32. However, if the CDP module determines 34 that information exceeding a certain risk level has been viewed then, while the user is allowed to continue browsing the website, a notification is generated to the CCM module so that a co-ordinator can set up a new case to ensure that follow-up action is initiated if the manager does not seek advice. Those pages of the website relating to high risk or complicated information also include contact information for an appropriate advisor, such as a telephone number or email address, and an instruction for the end user to contact the advisor to discuss the information that they have been viewing. For example, if it is determined that step 34 that a high risk topic has been viewed then a notification can be generated and sent to a co-ordinator at step 36. If it is determined that the manager has not called the advisory service to seek advice on that topic within a certain time period, as configured in the end user's profile in the CIM (e.g. 24 hours), then an action can be generated using the CCM module to diarise the advisor to call the manager to discuss the topic at step 38.

Depending on the level of risk, a follow up call from the advisor may or may not be required. If a follow-up call or other communication, for example by email, is required at step 38, then relevant advice on the topic is provided to the manager. Some topics may have a higher level of risk associated therewith which, as defined by the business rules, the advisor is not authorised to answer. In that instance, the co-ordinator can contact or communicate with a designated person, such as the business' internal HR advisor, and which will depend on the business rules, so that they can address the topic with the manager directly.

Hence, the invention helps identify potential risks in the business and ensures that appropriate advice is provided to address those risks by the person considered appropriate to do so by the business. For example, if a manager is considering making an employee redundant, then if they browse the advisory website to obtain information on how to do so, then either an external advisor or somebody from the business' internal HR function is tasked to call the manager and ensure the correct procedures are followed, if the manager has not called the advisor to seek advice within a certain time period. In the absence of such automatic identification of access to high risk information, the manager may take action without seeking appropriate advice and therefore expose the business to significant liability.

Figure 5:
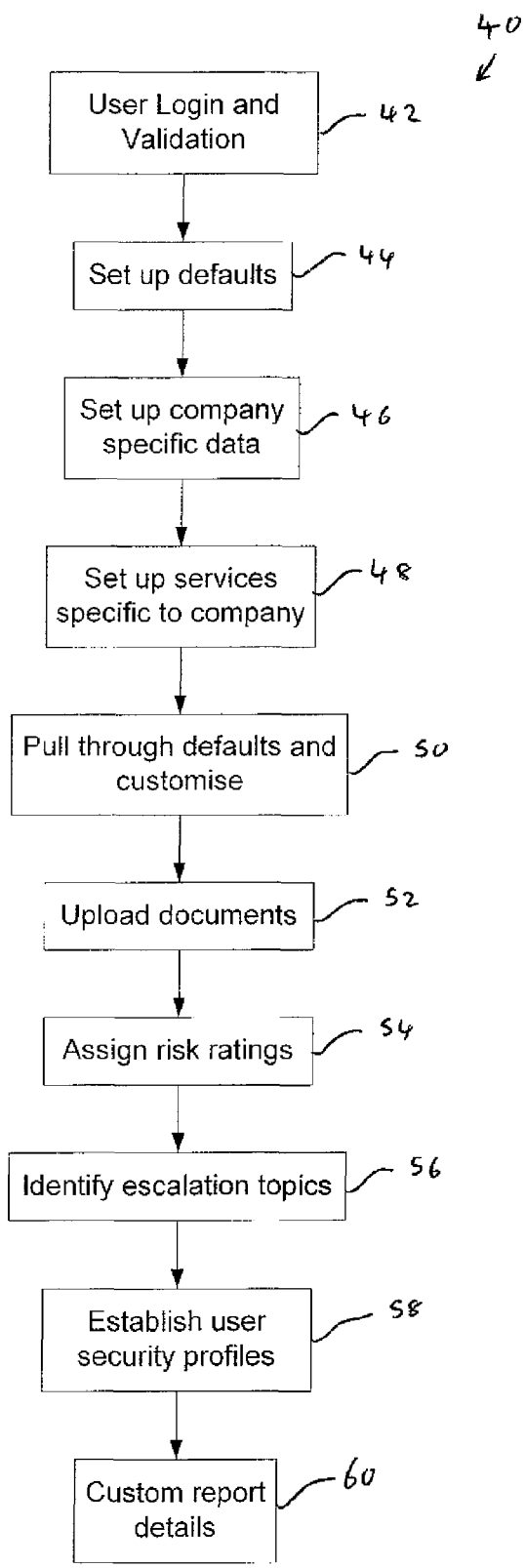
FIG. 5 shows a process flow chart illustrating the system implementation stage of the method shown in FIG. 4A.
Figure 6:
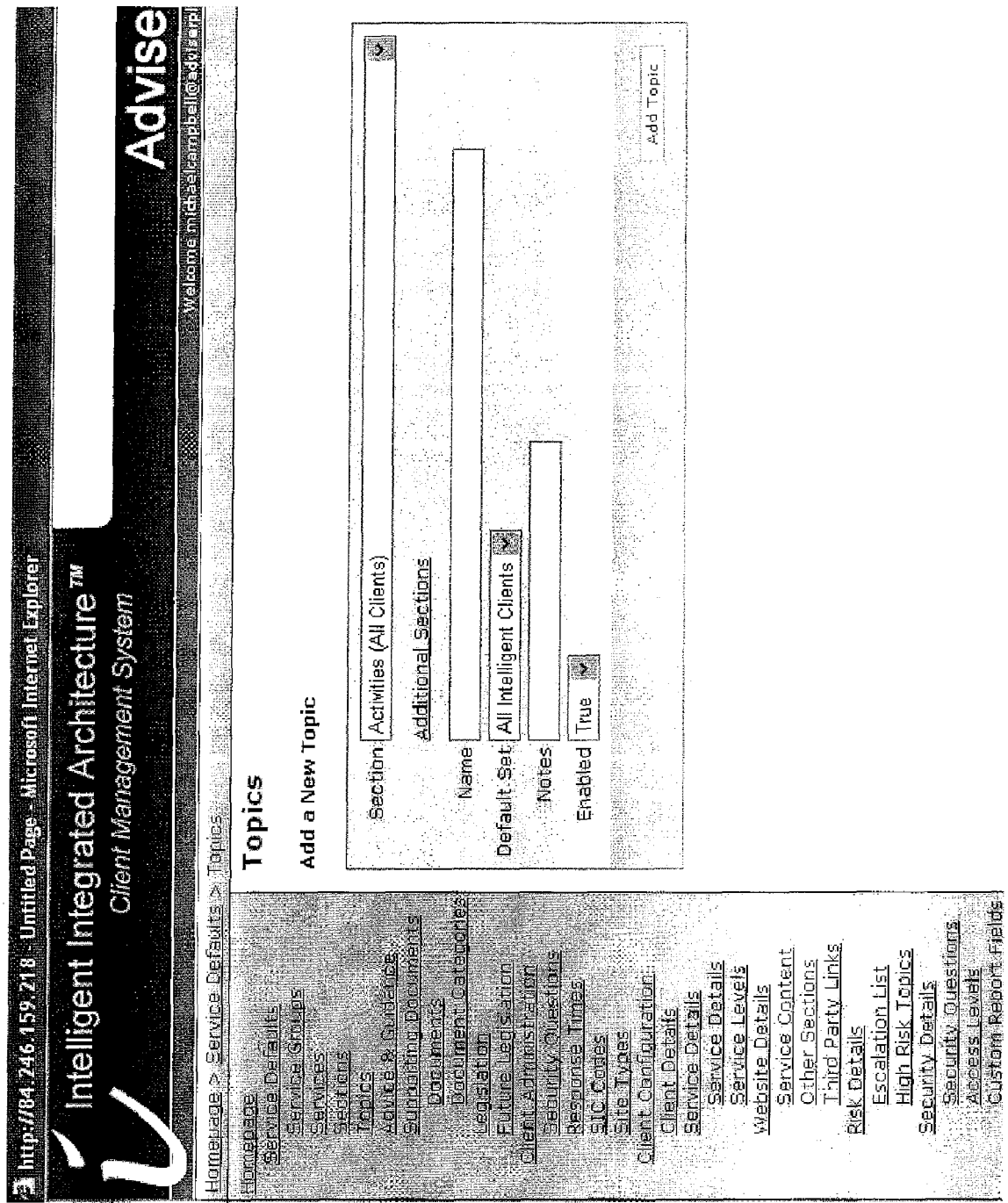
FIG. 6 shows a screen shot of a user interface of the client management system module of the invention.
Figure 7B:
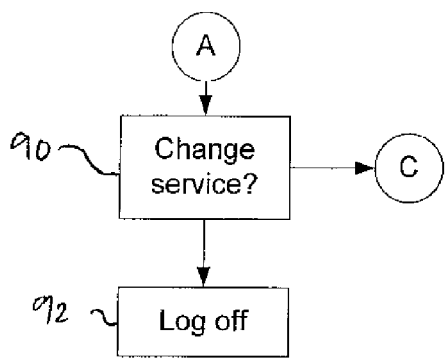
Figure 7D:
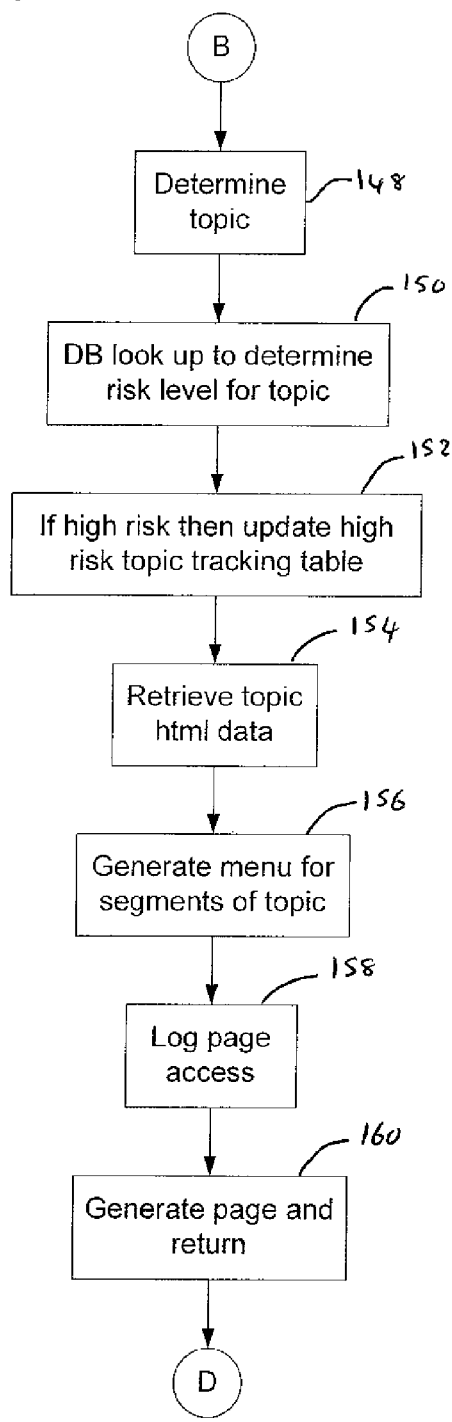

With reference to FIG. 5, there is shown a process flowchart illustrating a method of operation 40 of the CIM module during the system implementation phase 24. As explained above, the CIM module is used to build a service, including a website, and populate various tables of the database 112 with the information needed in order to provide a customised advisory services platform for a business. At step 42, the user implementing the website logs into the CIM module with their username and password, which are validated to ensure that the user is authorised to carry out implementation work, and the user is presented with a tailored set of functionalities. FIG. 6 shows a screen shot 70 of a part of the user interface presented to the user during the method 40. As can be seen in the left hand column of the user interface, the platform implementation includes three main stages: Service Defaults; Client Administration; and Client Configuration, each of which includes a number of sub tasks.

Service Defaults includes all the details of a generic default advisory service that can be provided by the CDP. The Client Administration section includes all the non-content specific data relating to client administration. The Client Configuration section includes all the data and information required in order to configure the website and customise the service for the specific business.

At step 44, various data items are entered via the user interface for each of the sub tasks of the default service set up and written to various tables in the database. The Service Groups data includes data indicating what group of different services may be provided by the web site. Every instance of default data, text information or document entered into any module in the Service Defaults section of CIM can be assigned to one or more Service Group. For example, a topic may relate to HR only. On the other hand, a supporting document may be relevant to both HR and health and safety Service Groups. A web site in CDP may present the content of one or more Service Groups simultaneously.

The Services data allows the recording of specific service names, e.g., Big Bank plc Intelligent HR Service. The Sections data includes an identifier, a name and a default landing page text for each of the different sections in a Service Group. For example, the HR Service Group may include a number of sections, including Starters, Employees, Leavers, etc. These comprise the primary menu selection in CDP.

The Topics data items include identifiers and names for each topic and the section identifier to which the topic belongs. This provides a mechanism for grouping topics under a single section. For example, the HR Starters section may include a number of topics relating to the start of an employment, e.g., attracting an applicant, offering the job, selecting the right person, etc. Topics represent the secondary tier of navigation in the CDP.

The Advice and Guidance section includes, for each segment of advice and guidance, a unique identifier, title, default text and topic to which the segment is linked. This provides a means for grouping segments by topic. The Advice and Guidance section includes all the advice content in the format of a free text field into which advice on the segment of the topic is provided. Segments of advice and guidance provide the tertiary level of navigation in the CDP.

The Supporting Documents section includes a Documents and Document Categories section. The Documents section includes data including an identification number, name, summary explanation, file name, document category (e.g. Forms and Records) and topics to which the document is relevant, for each document available for download. The Document Categories section includes data including an identification number and name specifying categories of document (e.g., Form and Records).

A Legislation section includes data specifying an identifier and a name for individual laws or acts relevant to a Service Group. A Legislation Content section can also be provided including an identifier, section identifier and a content field being a text field including re-written, plain English versions of relevant extracts from the legislation. Each section of legislation is then linked to one or more topic, to appear in the CDP when an end user opens a particular topic.

A Future Legislation section includes data specifying an identifier, name and text for acts or regulations due to have an impact. By assigning a piece of future legislation to a Service Group, the content appears in the Future Legislation section in the CDP for a service.

A Key Questions section enables an administrator of CIM to set up default questions, with accompanying notes, for individual topics. These default questions and notes, customizable on a per service basis subsequently, are drawn through into CCM to prompt advisers to ask certain core questions of case owner end users to ensure that all the correct facts are sourced before advice is imparted.

Sections, topics, segments of advice and guidance and supporting documents are also each set up with reference to a Default Set. The Default Set categorizes the audience for the elements e.g. All SMEs, Certain Large Businesses. When a service is created subsequently in the procedure, the service is assigned a Default Set and draws through content specific to the appropriate audience.

All elements at the Service Defaults level are capable of being deleted by administrators having appropriate access authorization. Strict validation controls ensure that an element cannot be deleted if it is in use by a service (e.g. you cannot disable a topic without first disengaging it from a service in which it is currently live), nor if it is being relied upon by another default element (e.g. you cannot delete a document category if supporting documents are linked to that category).

After the defaults have been set up, at step 46 client administration data is entered and stored in the database. The Client Administration module entitles an administrator of CIM to set up various non-content-specific default values that later facilitate the setting up of specific client, service and end user details.

The Client Administration module can also be used to set up default security questions, SIC codes, response times for service levels, web site types, default reports visible in MRS and contacts of the business providing the service. This data can be used subsequently to populate drop-down lists from which options can be selected during a service set up process.

After the company administration data has been set up, at step 48, data configuring the platform for the end user business is entered and stored in the Client Configuration Module. The Client Details data is stored in three separate tables comprising company, division and contact details tables. The company details table stores a unique identifier for the company, and other core company information including name, address, phone number, fax number, website address and SIC code. The division details table stores similar data items specifying details of the individual divisions of the company. The contacts table stores data relating to certain key individuals within the business, such as project sponsors or key stakeholders, including their contact details and responsibilities in relation to the service (e.g. authorisation to sign off business rules).

The Service Details section includes data items both specifying the service details and the service levels. The Service Details module specifies the service by the service group ID, service ID and default set, all drawn from the Service Defaults modules in the CIM. The service details information also includes basic information about the service, for example what it is called, its site type, the service groups, default set, contract start and end dates, internal client director and manager, advisers and co-ordinators assigned to the service (which is pulled through by the CCM). The Service Levels module itemizes certain elements of the business rules, including advice line information (e.g. advice line telephone number, salutation, answer phone message), e-mail information, pulled through by the CCM, which is used when sending e-mails (e.g. e-mail header, e-mail footer, e-mail sign off), sign off processes (e.g., for e-communications and web content) and other information such as ask the expert response times, branding guidelines, how expired users should be handled and the latest soft copy of the business rules.

The Website Details section enables the customization of the service's online delivery as viewed through the CDP. A service initially includes the default service content for that service group and default set (e.g. an SME HR service). The Service Content section allows an administrator of the CIM subsequently to customise business-specific titles, text and order of sections, topics and segments of advice and guidance, or even disable them. These actions may be performed at a service level or at individual tiers within access levels. Supporting documents may also be renamed, replaced or removed. Additional documents may be added if a business has its own specific documents beyond the standard documents available from the service defaults.

An Other Sections module allows control over whether certain parts of the website are displayed to various users or not. For example, access to a help line may be enabled or disabled depending on an individual user's privileges. This module allows CDP menu items such as FAQs, Future Legislation, Ask the Expert, Advice Line, How to Use this Service, News and e-Communications to be reordered, re-titled, disabled or presented with bespoke text by service and by access level within a service.

A Third Party Links section includes data providing information allowing links to other websites to be added to the website. The e-Communications section allows an administrator of the CIM to host via the CDP an archive of alert and newsletter e-communications, tailored by access level.

The Risk Details section comprises three components: Escalation Profiles, Red Telephones and Key Questions. The Escalation Profiles module in itself comprises three types of escalation: Referral Escalation, Information Escalation and High Risk Escalation. An Escalation Profile is assigned to an end user and determines how others are notified of cases on certain subjects. A Referral Escalation identifies topics in a service that should be handled by the business' in-house practitioners, the contacts to which they should be escalated and the language/e-mail templates used in the CCM to facilitate this. Information Escalations identify contacts who should be copied in on all e-mail correspondence through the CCM relating to certain topics. High Risk Escalations identify contacts who should be copied in on all e-mail correspondence through the CCM relating to cases deemed by advisers to be high risk, irrespective of the subject matter of the case.

The Red Telephone module enables an administrator of the CIM to set up the properties of risk groups for a service. A risk group identifies topics of risk to that group and is assigned to a group of end users (e.g. new line managers). The topics identified by that risk group cause the CDP to highlight to the user via the website that they need to contact an advisor to discuss the topic by causing a red telephone icon to be displayed on the web page, together with a contact instruction message and the telephone number for the advice line. Data items are stored in a table, including a service identifier, topic identifier, risk group identifier, message text and the appropriate telephone number. It may be agreed in the business rules that if an end users crosses a 'red telephone topic' in the CDP and fails to contact the advice line within an agreed timescale, as set up in the CIM, then the CCM draws up a list of outbound activity for call co-ordinators proactively to contact the end user to determine whether assistance is required with this high risk or complicated subject matter.

The Key Questions module allows an administrator of the CIM to customise default sets of key questions which are subsequently pulled through into the CCM, prompting advisers to ask certain core questions of end users to ensure that all the correct facts are sourced before advice is imparted.

A Security Details section includes a number of sections allowing data to be entered to specify the security levels of the website. The Security Questions section allows data items to be entered specifying security questions and answers associated with using the website. An Access Levels section has data items associated with it specifying the different levels of access available to different users of a single service. A Custom Report Field section allows an administrator of the CIM to set up reporting categories in a division, details of which are subsequently entered at a user level, to provide an increased level of reporting in the Management Reporting Suite (MRS).

A user administration module also exists which stores all end user information. This specifies the access and security privileges available for each user. The user admin module can include data items including: a user name; password; e-mail address; contact details; company name; division; details of services they can access; access levels; risk groups; answers to security questions; custom report fields; profile ID; internet access privileges; access to reporting; e-communication entitlements; and access to advice line, ask the expert and the CDP.

In FIG. 5, at step 50, the defaults for the website are retrieved and customised as required in order to provide the Service Details and Website Details detailed above. Any documents required are uploaded so that they are accessible by the website at step 52. At step 54 the risk ratings are assigned to each of the topics and at step 56 those topics requiring escalation are identified and any escalation details are entered as required using the Risk Details module described above. The user security profiles are established 58 and finally the customer report details are entered at step 60 in the User Admin module. The set up implementation 24 is then completed.

Operation of the advice website provided by the platform 10 in response to end user activity will now be described with reference to FIGS. 7A to 7D. A manager using manager client computer 120 logs into the intranet and browses a home page of the intranet. At step 72 the manager selects to view the advisory service website and are prompted to login and at step 74 an XML package including the user's user name and password is generated and sent to the CDP application on server 110. The operations carried out by the CDP are illustrated by the process flowchart of FIGS. 7C and 7D. At step 130, the CDP receives the XML package and verifies 132 the user name and password against data items stored in a user table. At step 136, the fact that the user has accessed the advisory website is logged in a tracking table, as is all subsequent activity, while the user is logged on.

If it is determined at step 138 that this is the first time that the user has logged in then a further security check is carried out by retrieving security questions and initiating a question and answer session with the user in order to verify the identity of the user. If the user passes the further security check then they can be directed to an e-learning tool to learn how to use the website. If this is not the user's first log-in then step 138 is skipped.

At step 140 a look-up of the user table is carried out to determine if more than one advisory service is available for this user. If not, then the CDP returns an HTML homepage for the one advisory service available to the user at step 142. If the user is authorised to use more than one service, e.g., HR and health and safety, then at step 144 an HTML page is returned listing the different services available to the user. In other embodiments, a link clicked on by the end user to access a service may be a link directly to one service or another.

Returning to FIG. 7A at step 76, the browser receives the HTML web page from the CDP and displays either the home page or the listing of available services which is rendered and displayed by the browser. At the point the end user accesses a service, the CDP interprets the view and permissions determined by the end user's access level, risk group and escalation profile and presents the appropriate options in the CDP accordingly.

Figure 8:
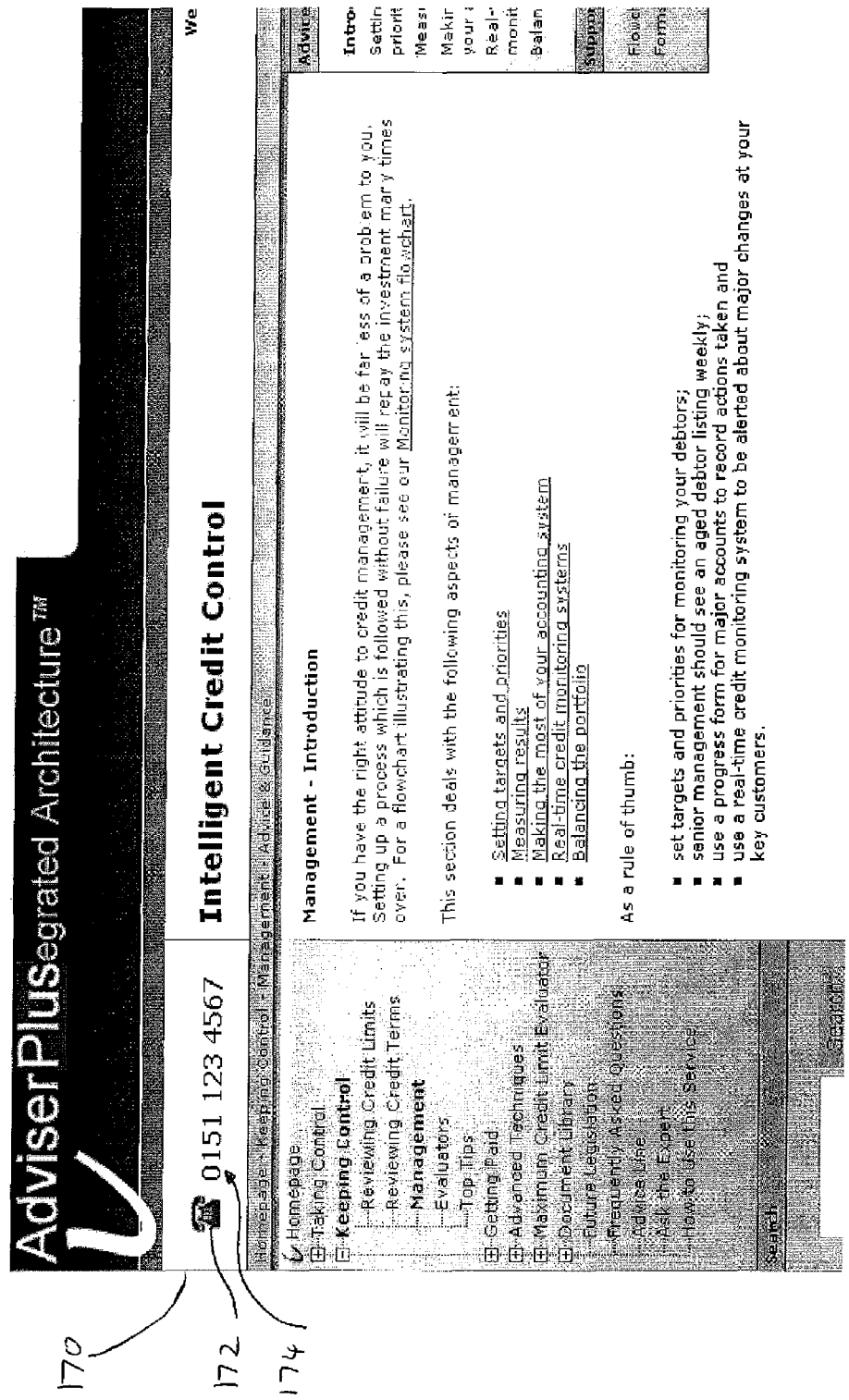
FIG. 8 shows a screen shot of a user interface of the content delivery platform module of the system generated during the method illustrated in FIGS. 7A & 7B via which a user can access advisory information.

For example, FIG. 8 shows a screen shot 170 of a web page displayed to the user. The left-hand column includes a list of sections available for a credit control advisory service. In the top left hand corner a red icon 172 of a telephone is displayed together with a telephone number 174 that a user can call to speak with an appropriate advisor for that subject matter area, provided the end user's access level provides the right permissions to use the advice line.

If at step 78 a section is selected then a query is sent to the CDP and the web page is updated to display a list of topics at step 80. If at step 82 a topic is selected then a query string is generated including a section identifier data item and a topic identifier data item which are passed to the CDP. At step 146 the CDP receives the topic request query string and parses the query string to extract and determine the topic identifier at step 148. Then a series of look-ups are carried out on the tables in the database 112 using the topic identifier. Firstly, a service level topic table is queried using the section identifier and topic identifier and if no content is found then the default level service table is queried to retrieve the content. A look-up is also carried out in a high risk topics table using the topic ID to determine the risk level associated with the topic. If the topic does have a high risk associated with it then an entry is written to a high risk topic tracking table that the topic has been accessed together with the user ID of the user accessing the topic at step 152. The fact that a high risk topic has been crossed is then posted to the CCM after a period of time according to the agreed business rules and set up in the CIM, prompting a call co-ordinator to make an outbound call to enquire whether the end user requires advice line assistance with this subject matter. The HTML data for the topic content is retrieved from the table at step 154.

A menu of segments of advice and guidance on the topic is also generated at step 156. This can include documents associated with the topic and also legislation associated with the topic. The segments of the topic are specified in a list in the service level segment table from the service default section, the documents are identified in a list from the service level documents table, or default version thereof, and the legislation for the topic is identified from the default level legislation data. The fact that the page has been accessed is logged at step 158 and at step 160 the page is generated from the retrieved data and returned to the browser. The topic page and all segments of the topic are displayed at step 82. The user can then read the displayed information and optionally carry out a number of other actions. If the topic is a high risk topic, then the displayed topic page includes a symbol of a red telephone together with a telephone number that the user must call in order to take advice on the subject.

A number of optional actions are available to the user. If the user selects a document 84 then the CDP receives the request to download the document which is retrieved from the database and returned to the browser for display. At step 86 a user with the requisite permissions can optionally choose to submit a query using an ask the expert e-mail enquiry function. A form is generated in the web browser and the user can complete the form and send a query via the CDP to the CCM, which then handles processing of the query. In other embodiments, further online help functions can be provided. Online help options include searching a bank of frequently asked questions, future legislation, advice line, guidance on how to use the service and an archive of the service's supporting e-communications, using a comprehensive, custom-built, search functionality built into the CDP. After the user has finished browsing, at step 90, if more than one advisory service is available to them, they can select to change to a different service and processing returns to step 70 and the user is again verified for the new service, as their user privileges may differ from service to service. If the user does not select to view another advisory service then at step 92 they may log off from the advisory service website and be returned to the home page of the intranet.

Every action in the CDP is tracked using a custom-built tracking service. The output of the tracking table can be viewed through the Management Reporting Suite (MRS), which contains a series of web page, document and login reports, covering detailed activity, summary information and monthly trends. These reports may be accessed either internally, or by the end user, via permissions set up in CIM.

Use of the Case and Call Manager application by a co-ordinator of the advisory service provider in order to manage actions required as a result of user of the advisory website by end users will now be described with reference to FIGS. 9A, 9B, 10, 11 and 12.

Figure 9A:
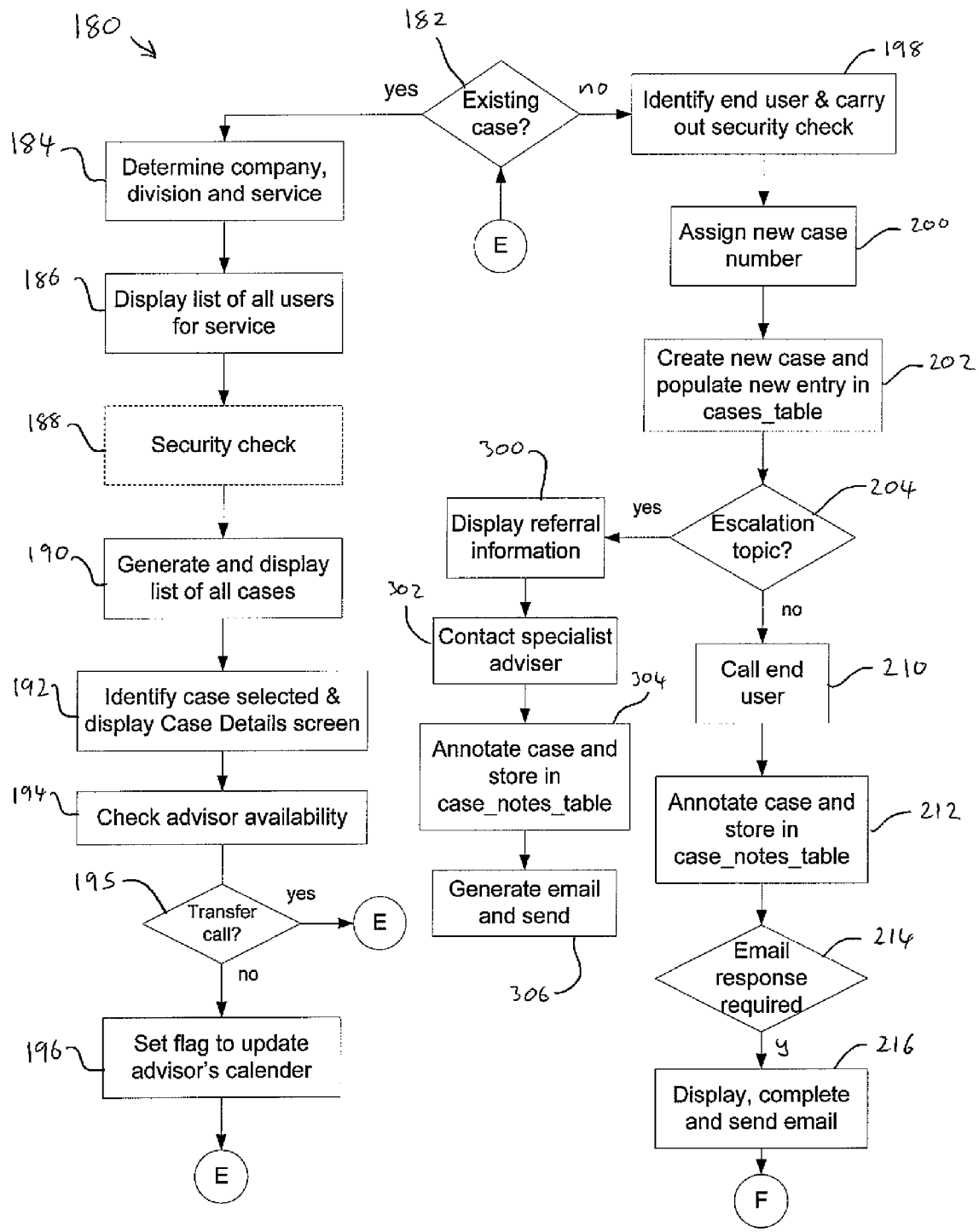
FIGS. 9A & 9B show a process flow chart illustrating operations carried out by a case and call manager module of the system.
Figure 9B:
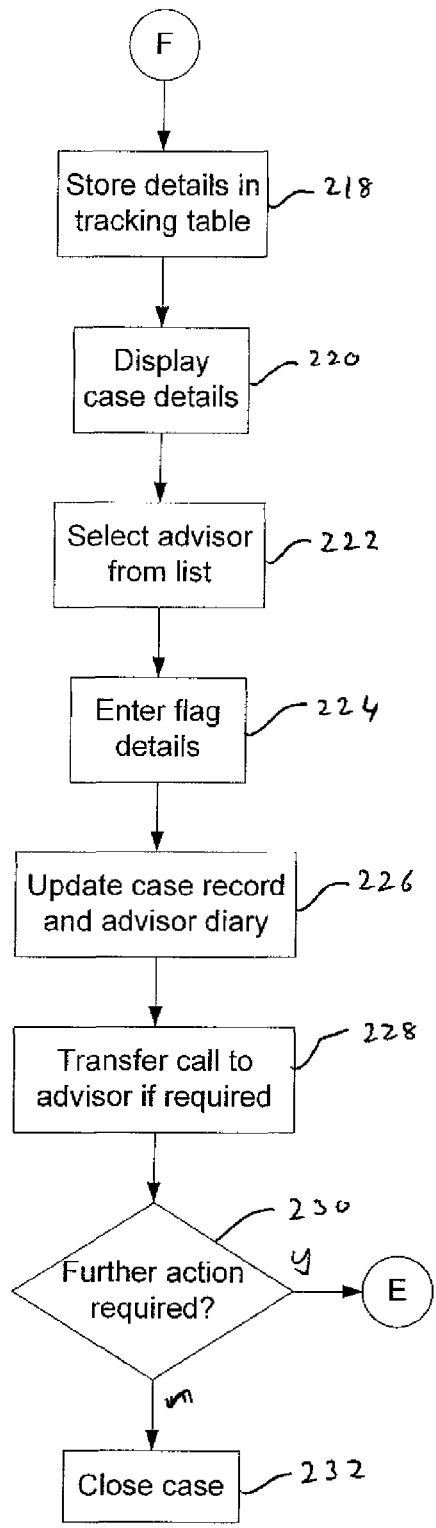

FIGS. 9A and 9B show a flowchart illustrating a method 180 of case and call management carried out by the CCM module 14. A co-ordinator or adviser of the advisory service provider interacts with the CCM module 14 on the server 110 via a browser application on their computer. For an existing advice case, the call co-ordinator or the adviser calls the end user, or the end user has made an inbound call to the co-ordinator in relation to an existing case and so processing branches at step 182 to step 184. If the case number is already known, then the co-ordinator can input the case number and open the case directly. If the case number is not known, then the co-ordinator identifies the company, division within the company and advisory service of the end user associated with the case (sometimes referred to herein as the case owner end user). An inbound call from an end user means that the telephone number of the end user can be used to identify the advisory service by associating a different incoming telephone call number with each advisory service. At step 186 a list of all authorised users for the service is displayed, drawn from the CIM.

The call co-ordinator can then select the end user's name from the displayed list and at step 190 the CCM generates and displays a list of all open and closed cases for the end user in date order, and including the date the case was created, its case number, the subject matter of the case and the latest or most recent adviser. At step 192, the co-ordinator can select a case number from the case history list of the end user, which causes the CCM, by carrying out a series of look ups, to display a Case Details screen which includes all the details for the selected case. A Colleague Availability button can then be operated at step 194 to check the availability of the adviser previously handling the case and to whom the co-ordinator intends to transfer the call in case the case adviser is unavailable, for example, because the are on holiday or currently handling another call. A colleague availability window can be displayed to the co-ordinator indicating the availability of the adviser and whether an adviser or co-ordinator is assigned to support the service, as set up in the Service Details module of the CIM. If the adviser is available, then the call is transferred at step 195. If the adviser is not available, then at step 196 the call co-ordinator can set a flag to cause the CCM to update the advisor's calendar so that the advisor is prompted to contact the end user at a future date or time. The co-ordinator can then complete handling the telephone call and processing returns to step 182.

Whether the call co-ordinator is opening a new case or an existing case, there are a number of situations in which the case will not open automatically. If the business rules dictate the need for security questions for the service, then upon attempting to open a case, a list of security questions (as set up in the CIM) and the user's responses (as entered by the end user via the CDP) are displayed to the co-ordinator. The co-ordinator can then ask the security questions to the caller to verify their identity at optional step 188.

If the end user has been set up in the CIM with no access to the advice line, a warning message is displayed to the call co-ordinator, prompting that advice should not be given.

If the end user is set up in CIM to indicate that the end user has had no training in how to use the service, then a warning message is displayed to the call co-ordinator to indicate that the advice should be imparted in a different way to how it should be imparted to an experienced, trained end user.

If the end user's entitlement to use the service has expired as indicated by the CIM, then a warning message is displayed to the call co-ordinator, indicating to the co-ordinator how to deal with an expired end user. This information is entered previously at a per service level in the CIM.

If it is determined at step 182 that the call is in relation to a new case then processing proceeds to step 198 at which the end user is identified in a manner similar to that described above for existing cases and it can be determined whether the end user is entitled to use the advice line by carrying out security question step 188.

At steps 200 and 202, a new case number is generated and assigned to the case at the same time as a new case is created and a new entry in a cases table is created and populated with the case number and the user information. The call co-ordinator then sets up the skeleton details of a new case. Doing so includes entering topic information, and at the point of entering topic information, a look up is carried out of the end user's escalation profile using the topic ID. This can result in one of three outcomes.

If it is determined at step 204 that for this user's escalation profile for this service, as set up in the CIM, the topic is a referral escalation, i.e. the topic needs to be referred to a specialist adviser, then a message is displayed to the call co-ordinator at step 300 indicating who they need to contact to handle the case. The co-ordinator can then call or email the specialist adviser at step 302 who can then contact the end user to resolve the enquiry. The co-ordinator then annotates the case and stores case details in a case notes table at step 304. An email template, set up in the CIM for the profile, is pulled through into the CCM to facilitate the transfer of information to the specialist, and an email is prepared and sent to the specialist adviser at step 306.

At step 204 it may be determined from the end user's escalation profile in this service that the topic is an information escalation topic, i.e. information about the enquiry into the topic needs to be provided to various people, but referral escalation is not required. In this case, e-mail addresses for various users of the system, such as the end user's manager or internal advisers are copied in automatically on any e-mailed correspondence relating to this case.

If at step 204 it is determined that the topic is neither a referral escalation nor an information escalation topic for the end user, then the call co-ordinator can continue as normal.

In the event of the second and third instances above, on checking the availability of an appropriate adviser colleague, the co-ordinator will either transfer the caller for immediate consultation or flag a follow-up for a later point as described in greater detail below.

The CCM also facilities a proactive outbound call activity programme. If the business rules so dictate, then the CIM for a service may be set up so that various online activities by an end user in the CDP prompts a co-ordinator to contact the end user. In the CIM, referral escalation topics are those topics that should be handled by a specialist adviser. Additionally, topics identified in a risk group as being of a complex nature for a particular set of end users are indicated in the CDP by red telephone call-outs. If an end user passes over either a referral escalation topic or a red telephone topic, then a time is set by which the end user should contact the advice line before proactive outbound call activity is begun by the co-ordinator. The time delay after which an adviser should call the end user, if the end user has not contacted the advice line in the meantime, is set in the CIM by an administrator. The front screen of the CCM for co-ordinators contains a panel entitled Manage Outbound Calls. This displays information relating to all incidences of online referral escalation or red telephone incidences that have not yet been turned into cases.

Figure 12:
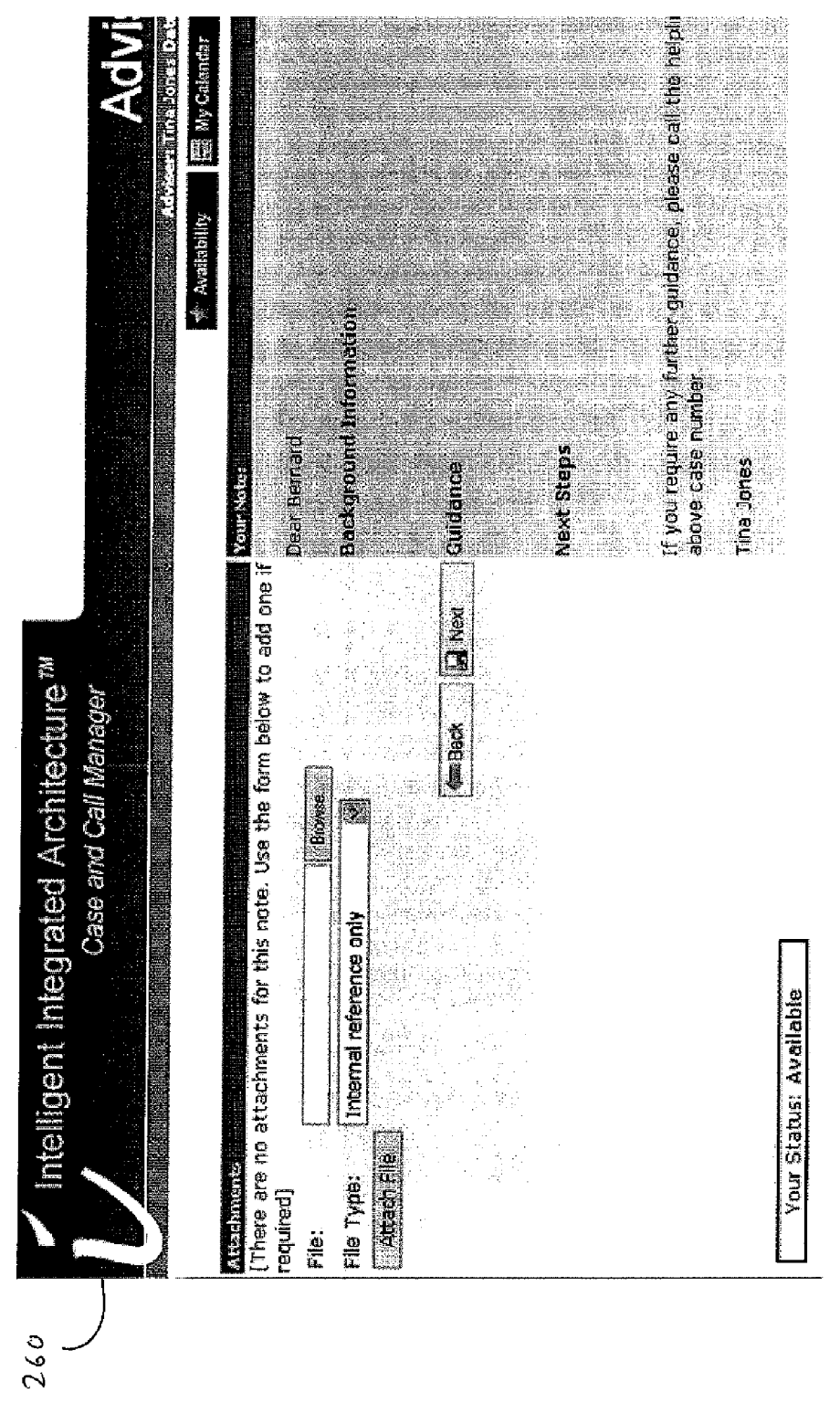

At step 210, the call co-ordinator telephones the end user to discuss the enquiry. It may turn out at this stage that the topic view is accidental or there may be some other reason why the case does not need further handling. Alternatively, it may be that the topic view was intentional and that the manager requires further advice in order to take appropriate action. At step 212 the case is annotated with details of the conversation and the case note is stored in a case notes table. If further action is required, then the co-ordinator will transfer the case to an adviser for any follow up action, such as providing advice via telephone and/or sending any follow-up email to the end user. At step 214 it is determined whether any email should be sent to the end user by the co-ordinator. A look-up is carried out of the profile table in order to identify any further parties the email should be copied to, such as a higher manager in the organisation. Alternatively, if the matter has been escalated, then the email may also need to be sent to the end user and also the person who will handle the escalation. FIG. 12 shows a screen shot 260 of a page of the user interface of the CCM which allows an email response to be prepared and sent to the end user. At step 216 a proforma email is displayed, as illustrated by screen shot 240 in FIG. 12, and completed and sent to the appropriate parties. The case activity details are then stored in the tracking table at step 218.

Figure 10:
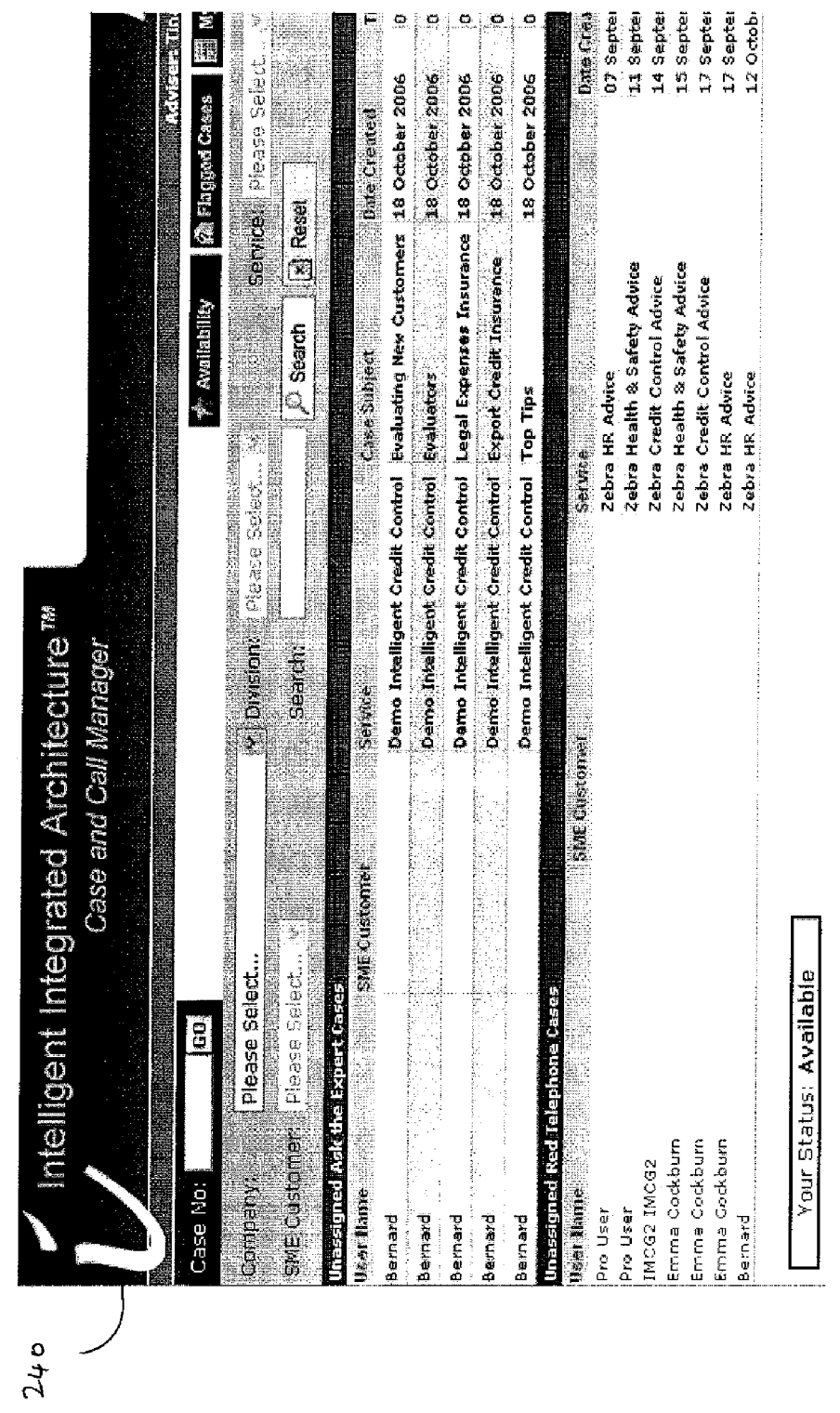

At step 220, the case details are displayed to the co-ordinator. FIG. 10 shows a screen shot 240 of a screen of the user interface of the CCM, including a bottom portion displaying a list of high risk topic cases which have not yet been assigned to an advisor.

Figure 11:
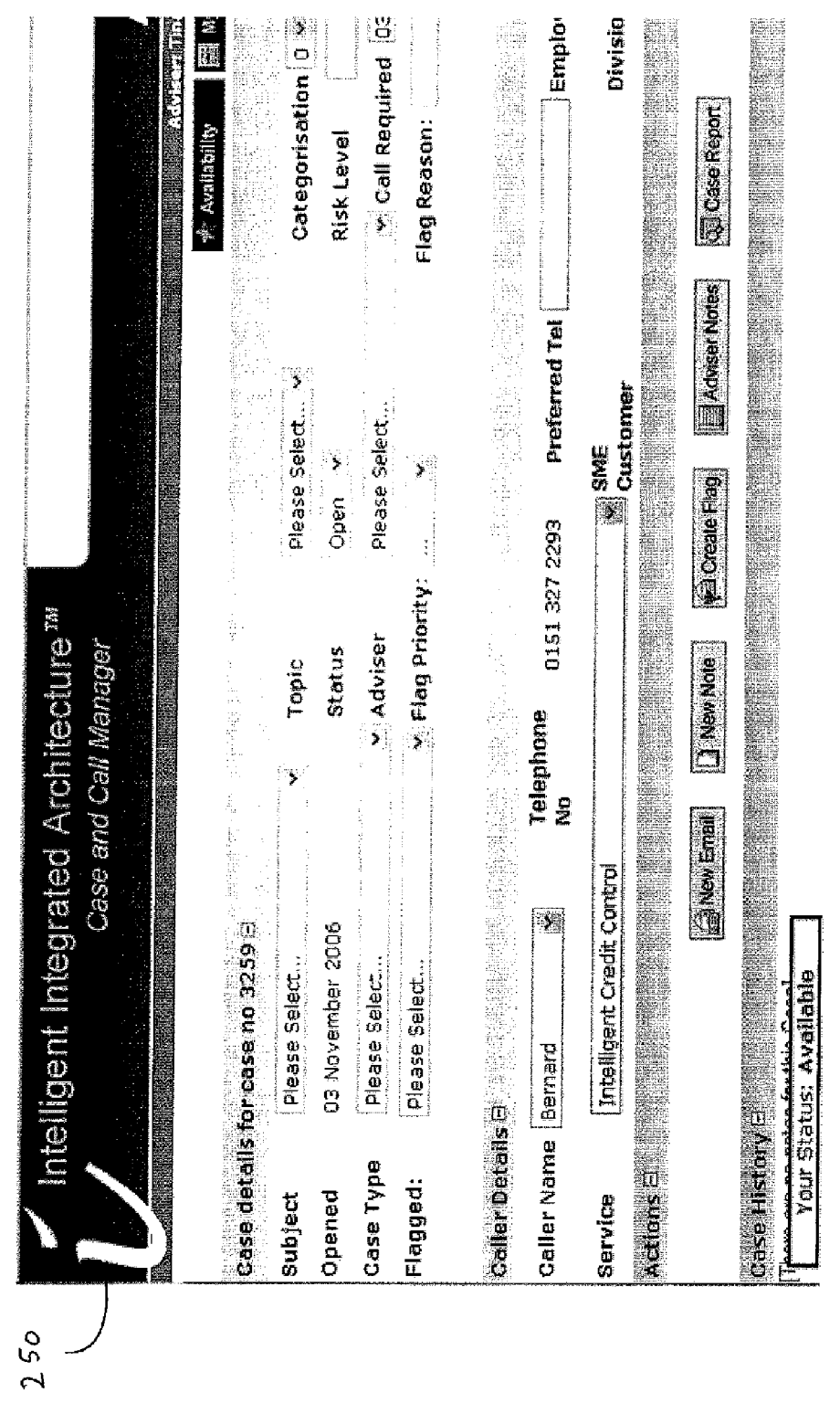

Therefore, at step 222 an advisor is identified from a drop down list and various flag details can be set. FIG. 11 shows a screen shot 250 of a page of user interface of the CCM showing the various fields of a case, including the data items that can be set by the co-ordinator or adviser, the caller details and the possible actions which can be carried out in connection with a case, such as generating a new case note, creating a flag, creating notes for an advisor and reporting on the status of the case. For example, a flag can be set indicating that an advisor call is required. A flag can be set indicating the priority, i.e., normal or urgent. A flag can be set to make a call at a future date. Also, more detailed information can be entered into a free text field. At step 226 the case record is updated. An advisor's diary can also be updated if required by the flags set. If required, and if an advisor is currently free, then at step 228, the co-ordinator can manually transfer the call to an advisor to discuss the high risk topic with the end user. If further action is required then processing returns to step 182 and the case can be handled in future as described above, depending on any outstanding actions. If no further action is required on the case, for example because the high risk topic view is accidental then at step 232 the case can be closed by the co-ordinator, or an adviser.

Figure 13:
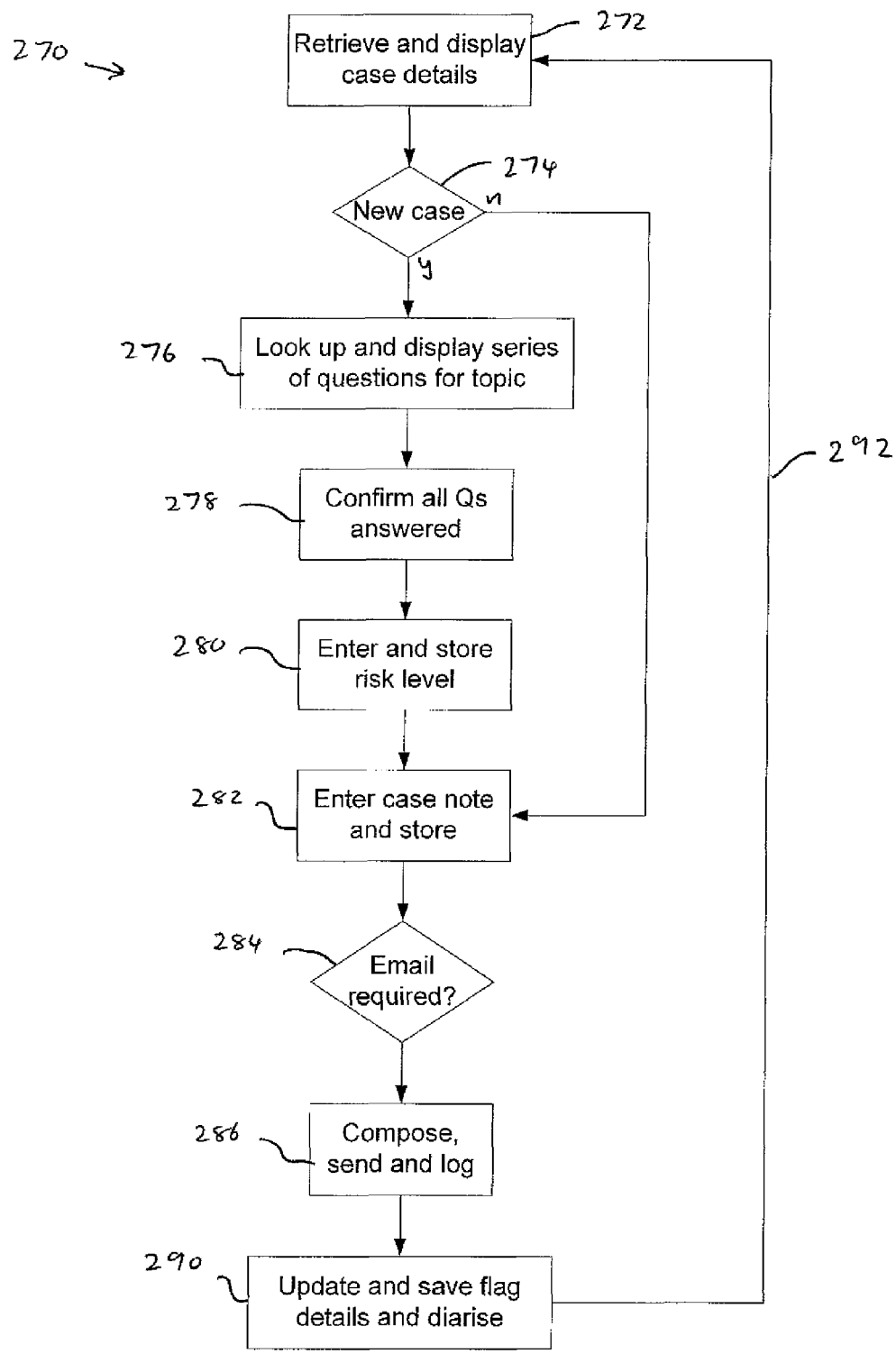
FIG. 13 shows a process flow chart illustrating operations carried out by the case and call manager module while being used by an advisor.

FIG. 13 shows a process flow chart illustrating a method 270 of operation of the CCM module while an advisor is handling a call using the CCM module 14. The advisor accesses the CCM module on server 110 via browser on advisor client machine 116. The advisor may be using the CCM module to handle diarised actions or to take a call transferred from a call co-ordinator, as described above. Irrespective, the advisor receives a phone call either from the co-ordinator or from an end user and can search via the user name or using the case number to identify the case record and display the case details entered by the co-ordinator at step 272. If it is determined at step 274 that this is a case on which the advisor has previously worked, then the advisor can provide advice over the telephone to the end user and enter any case notes and store those case notes at step 282.

If this is a new case that the advisor is handling then the advisor has an initial conversation with the end user to establish the background. If the subject matter of the call is one for which key questions are set up for the service, then the adviser must ask of the caller a number of core questions at step 276 to determine the basic facts of the case before guidance is provided and then confirms that all the core questions have been asked to the end user at 278. After the questions have been asked, the call can be terminated. At step 280, the advisor can enter a risk level associated with the case. For example, if the advisor considers that there is a high risk that the end user will do something giving rise to a significant liability, a higher risk value may be associated with the case. Alternatively, if the answers to the questions satisfy the advisor that the risk posed by the end user is low, then a low risk value may be assigned to the case. The risk level is used to flag to co-ordinators, advisers and the management of the business (via the MRS) those issues that they need to monitor carefully. At step 282 a case note is prepared and stored in a case note table. An initial draft of the case note can be prepared but once a case note has been put into a final form then it cannot be further changed. A case note can be e-mailed to the caller and/or anyone else dictated by the setup in the CIM, and the case note can subsequently be forwarded through the CCM.

A look-up is automatically carried out of the service details table to determine 284 whether an email is required as a result of the telephone conversation. If so, then the recipients of the email are retrieved from the database and the email is composed, sent and the sending of the email and recipients are logged. The CIM holds a basic template for the e-mail at a service level, ensuring consistency of presentation of advice is achieved. Then at step 290 the flag details for the case can be updated to indicate a next action. For example, the next action may be for the end user to contact the advisor, for the advisor to contact the end user or for the advisor to carry out some further research before advising. A date can also be entered into the diary system to follow-up on the next action at a future date. The updated case details are then stored. The process can then return to step 272 as illustrated by process flow line 292. The advisor can then either take a new call or carry out actions on an existing case.

An adviser's default landing page in the CCM, either when they first log on or complete an action such as saving or closing a case, is an All Cases screen. For an adviser, the view defaults to display just their open cases with a follow-up action due to be undertaken before the end of the following working day. An adviser can expand the default view of the All Cases screen by around twenty criteria, including viewing colleagues' cases, closed cases, high risk only cases, urgent cases and ask the expert only cases. An adviser can open an existing or new case from this screen. All open cases have a flag and will appear in the All Cases screen depending on the view selected.

The CCM also includes a detailed training workflow process module, facilitating the training of end users in how to use the service. This training module takes the end user through the statuses of being not trained, training scheduled, undertaking the training and marking the user as fully trained. This basic user training information is held in the CIM.

The CCM facilitates the changing of an end user part-way through a case, whilst maintaining the necessary security checks. An adviser or co-ordinator can also print a non-editable report in pdf file format on the case, pulling through key information including the detailed adviser notes on each stage of the case.

E-mail ask the expert enquiries entered and sent by an end user via the CDP are posted directly into a database held by the CCM, thereby removing the actual electronic mail element of the process. Unallocated ask the expert enquiries are picked up by co-ordinators using the CCM, who assign them case numbers and allocate them to an appropriate adviser. The ask the expert response time set up for a service in the CIM informs the co-ordinators and advisers of the time by which a response must be sent to the end user in line with the service's service level agreement (SLA).

A Library module in the CCM allows senior advisers to set up a library of stock phrases and explanations for common pieces of advice. These can then be drawn upon by all advisers when typing case notes to e-mail to end users to save time and ensure that consistent, accurate advice is provided.

In a reporting phase 28, the end user organisation or the advisory service provider can use the Management Report Suite (MRS) 18 to carry out a number of reports to determine the performance of the system. For example, senior management of the organisation may run a weekly report to identify any managers who are viewing high risk topics on a frequent basis and not calling the advisory service within the set time limits. This may be indicative of a manager not following standard procedures and who needs further training. Further, reports can be generated showing the number of cases that have been escalated so that senior management are aware of any potential activities which may give rise to significant liabilities. Hence, the senior management of the organisation have a more accurate understanding of the behaviour of their employees and also the potential for liabilities arising.

The advisory service provider may also carry out reporting to monitor the behaviour of their own advisors and co-ordinators to determine the number of cases being handled, how rapidly, and how long they are taking to be completed. This information could be used to determine that further advisors and/or co-ordinators are required and also to identify different service areas or topics that may require more or less support.

Different levels of access to reporting information may be available depending on the user privileges assigned to any user. For example, only the highest management may have access to all reporting data and more junior management may have access to a restricted amount of reporting data.

Generally, embodiments of the present invention employ various processes involving data stored in or transferred through one or more computer systems. Embodiments of the present invention also relate to an apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

In addition, embodiments of the present invention relate to computer executable instructions or code, computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

Although the above has generally described the present invention according to specific processes and apparatus, the present invention has a much broader range of applicability. In particular, aspects of the present invention are not limited to any particular kind of advisory service or organisation and can be applied to virtually any organisation and combination of internal and/or external advisors. One of ordinary skill in the art would recognize other variants, modifications and alternatives in light of the foregoing discussion.

It will also be appreciated that the invention is not limited to the specific combinations of structural features, data processing operations, data structures or sequences of method steps described and that, unless the context requires otherwise, the foregoing can be altered, varied and modified. For example different combinations of structural features can be used and features described with reference to one embodiment can be combined with other features described with reference to other embodiments. Similarly the sequence of the methods step can be altered and various actions can be combined into a single method step and some methods steps can be carried out as a plurality of individual steps. Also some of the structures are schematically illustrated separately, or as comprising particular combinations of features, for the sake of clarity of explanation only and various of the structures can be combined or integrated together or different features assigned to other structures.

Hence, it will be appreciated that the present invention allows a highly tailored advisory service to be provided to an organisation without requiring the organisation to staff that advisory service themselves. Hence, all the benefits of a significant advisory service can be provided to an organisation without the organisation having to put in place that infrastructure. Further, by assigning risks to different topics and setting up business rules, an organisation can use the system to determine areas in which significant risks may be arising. The organisation can also control which of those matters they are happy for the advisory service to handle and which of those matters they want to handle themselves. Further, the system provides management with a detailed overview of the activities of their management team helping to identify potential risk areas.

While the invention has been described in terms of preferred embodiments, there are alterations, permutations and equivalents which fall within the scope of the invention and which have been omitted for the sake of brevity and clarity of explanation. It is therefore intended that the scope of the invention should be determined with reference to the appended claims.

What is claimed is:

1. A method for an advisory services provider to provide advisory services to an organization, comprising:
   the advisory services provider:
      providing information relating to a plurality of different topics accessible over a computer network by a plurality of end users being members of the organization, the information being accessible by the end users using end user devices;
      monitoring access to the information by the end users using the end user devices;

determining that the information relating to at least one of the topics pre-identified as being high risk has been accessed by at least one of the end users using one of the end user device;

in response to the determining that the high risk topic is accessed by the at least one end user, displaying a visual indication at the at least one of the end user devices that the at least one of the end users is required to contact an advisory service provider of the advisory services provider; and determining whether the at least one end user has communicated with the advisory services provider within a predetermined time period, and if not, initiating, by at least one co-co-ordinator, a communication from the authorized individual to the at least one of the end users to advise the at least one of the end users on the at least one topic.

2. The method of claim 1, further comprising:

determining that the topic corresponds to a topic identified as requiring escalation to a particular type of authorised individual; and wherein the communication is initiated between the end user and the particular type of authorised individual.

3. The method of claim 2, wherein the authorised individual is internal to the organisation or external to the organisation.

4. The method of claim 1, wherein the authorised individual is a member of the advisory services provider.

5. The method of claim 1, wherein ensuring that a communication is initiated further comprises:

determining whether the end user has communicated with the advisory service provider within a predetermined time period, and if not, then initiating the communication between the end user and the authorised individual.

6. The method of claim 1, further comprising:

providing a communication channel to at least one co-ordinator who can manage communications between end users and the advisory services provider.

7. The method of claim 6, wherein the at least one co-ordinator can also manage case records relating to end user access of information and/or communications between the end user and authorised individuals.

8. The method of claim 1, further comprising:

displaying a visual indication that the end user is required to contact the advisory service provider when information relating to a topic identified as being high risk is being accessed by an end user.

9. The method of claim 8, wherein the visual indication includes an icon of a telephone.

10. The method of claim 1, and further comprising:

documenting all interactions between the end user and an adviser and/or co-ordinator of the advisory services provider.

11. The method of claim 1, and further comprising:

providing data relating to interactions between all end users and the advisory services provider in a plurality of different reporting formats.

12. A non-transitory computer readable storage medium bearing computer program instructions which when loaded into a computer system configure the computer system to:

provide information relating to a plurality of different topics accessible over a computer network by a plurality of end users being members of the organization, the information being accessible by the end users using end user devices;

monitor access to the information by the end users using the end user devices;

determine that the information relating to at least one of the topics pre-identified as being high risk has been accessed by at least one of the end users using one of the end user device;

in response to the determining that the high risk topic is accessed by the at least one end user, display a visual indication at the at least one of the end user devices that the at least one of the end users is required to contact an advisory service provider of the advisory services provider; and determine whether the at least one end user has communicated with the advisory services provider within a predetermined time period, and if not, initiate, by at least one co-co-ordinator, a communication from the authorized individual to the at least one of the end users to advise the at least one of the end users on the at least one topic.

* * * * *